Sept. 10, 1963     R. ESCURSELL-PRAT     3,103,096
AUTOMATIC DOFFING AND DONNING APPARATUS
Filed June 30, 1960            7 Sheets-Sheet 1

INVENTOR.
Roberto Escursell-Prat
BY
Michael S. Striker
ATTORNEY

Sept. 10, 1963    R. ESCURSELL-PRAT    3,103,096
AUTOMATIC DOFFING AND DONNING APPARATUS
Filed June 30, 1960    7 Sheets-Sheet 2

INVENTOR.
Roberto Escursell-Prat
BY
Michael S. Striker
ATTORNEY

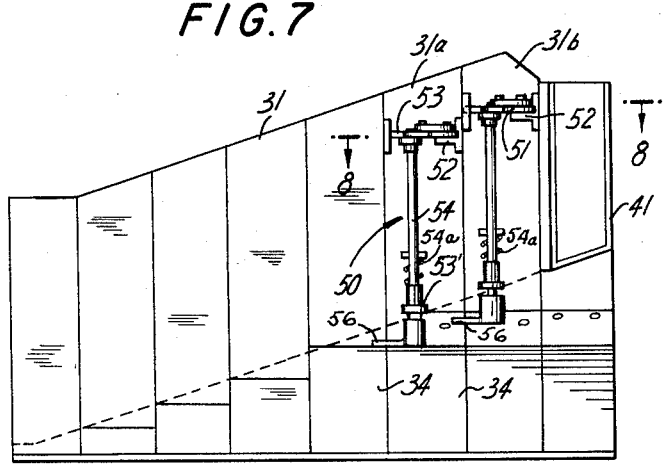
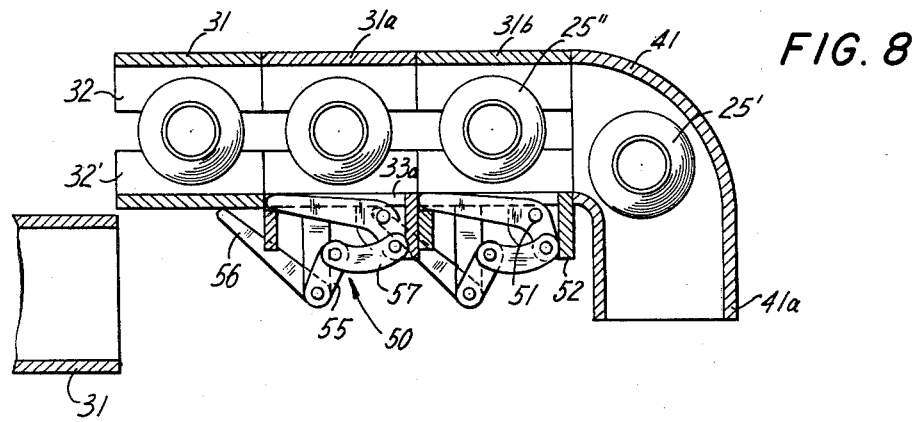
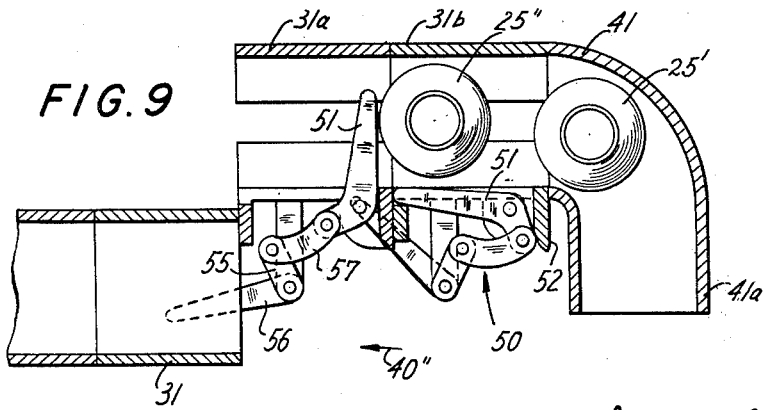

Sept. 10, 1963 R. ESCURSELL-PRAT 3,103,096
AUTOMATIC DOFFING AND DONNING APPARATUS
Filed June 30, 1960 7 Sheets-Sheet 5

INVENTOR.
Roberto Escursell-Prat
BY
Michael S. Striker
ATTORNEY

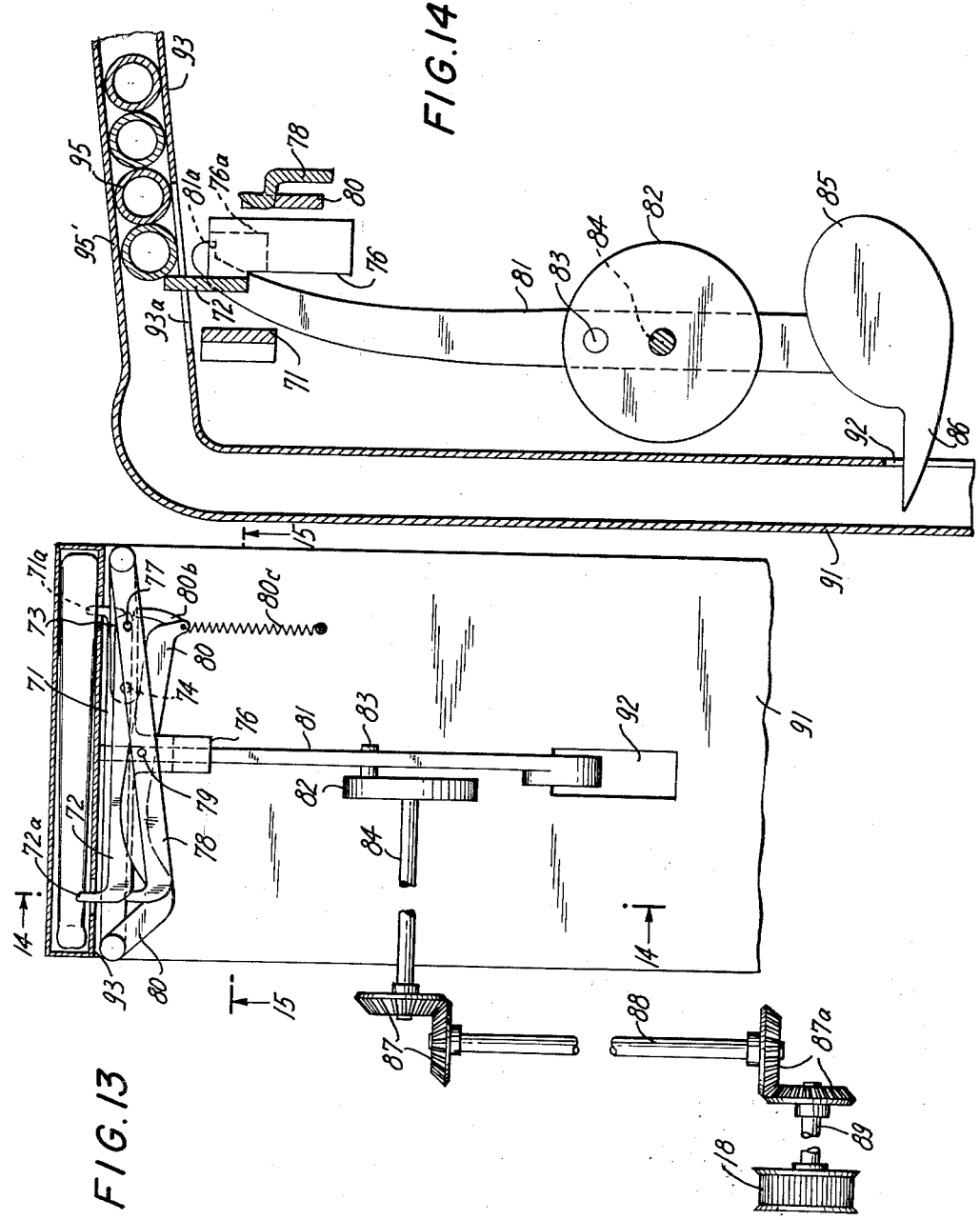

Sept. 10, 1963  R. ESCURSELL-PRAT  3,103,096
AUTOMATIC DOFFING AND DONNING APPARATUS
Filed June 30, 1960  7 Sheets-Sheet 7

INVENTOR.
Roberto Escursell-Prat
BY
Michael S. Striker
ATTORNEY 3,103,096
AUTOMATIC DOFFING AND DONNING
APPARATUS
Roberto Escursell-Prat, Avenida Mandri 35,
Barcelona, Spain
Filed June 30, 1960, Ser. No. 39,864
Claims priority, application Spain Jan. 5, 1957
26 Claims. (Cl. 57—53)

The present invention relates to an automatic doffing and donning apparatus, and more particularly to an apparatus for doffing bobbins from a row of spindles on a spinning machine.

The present invention is a continuation-in-part application of my copending application Serial No. 705,048, filed December 24, 1957, now U.S. Patent No. 2,961,822, for a "Method and Device for the Mechanical Doffing of Full Cops and the Replacement Thereof by Empty Tubes."

My copending application discloses an apparatus in which a plurality of doffing means are provided, each of which is mounted for angular movement between an inoperative position and an operative position aligned with the spindles of a spinning machine. Each doffing means is provided with an inclined cam track, and when all doffing means are in the operative position, the cam tracks form a composite cam track acting on the bobbins to raise the same above the supporting spindles as the doffing means are moved along the row of spindles.

Each doffing means is pivoted from its inoperative position to its operative position when the respective doffing means is located laterally of the space between one end frame of the spinning machine, and the first spindle. The apparatus is then moved to the next following position in which the first doffing means cooperates with the first spindle, while the second doffing means can be turned from its inoperative position to its operative position aligned with the row of spindles. When all doffing means have thus been aligned with the row of spindles, the apparatus is moved along the row of spindles so that the full bobbins are engaged by the cam track and are gradually raised on the same until they are lifted off the spindles. When the apparatus arrives at the far end of the spinning machine, and the first doffing means is located in the space between the last spindle and the other end frame of the spinning machine, the first doffing means is pivoted from its operative position to its inoperative position, and the apparatus is moved another step until the second doffing means is located in the space and can be pivoted to its inoperative position. These operations are continued until all doffing means have been placed in inoperative positions so that the apparatus can be removed from the spinning machine without interference of the doffing means with the end frame of the machine.

It is one object of the present invention to improve the apparatus disclosed in the U.S. Patent No. 2,961,822, and to provide an apparatus of this type in which doffing means and donning means are automatically moved from the inoperative position to the operative position when the apparatus passes the space between the first end frame and the first spindle, and are automatically moved from the operative position to the inoperative position when the apparatus passes the space between the last spindle and the other end frame.

Another object of the present invention is to control the automatic shifting operation of the doffing and donning means by control cams provided on the spinning machine.

The cam track of at least the last doffing means is located above the upper ends of the spindles, in order to raise the doffed bobbins from the spindles. When doffing means having such high cam tracks arrive at the end of the spinning machine, and the adjacent leading doffing means is moved from its operative position to its inoperative position, a bobbin raised by the cam track above the respective spindle has no lateral support, and may topple over instead of riding upwardly on the cam track to a discharge position, as desired. In the other positions of the doffing apparatus, the adjacent leading bobbin is still supported on the respective spindle and prevents a toppling over of the freed adjacent trailing bobbin in the wrong direction.

It is a further object of the present invention to provide means for holding a bobbin lifted off the respective spindle, when the adjacent leading doffing means moves at the end of the spinning machine to its inoperative position.

In the construction of the doffing apparatus of my U.S. Patent 2,961,822, the doffing means are supported on a carriage which is mounted on a trolley for vertical relative movement, while being connected to the trolley for movement along the row of spindles. The carriage moves along rails extending exactly parallel to the row of spindles, while the trolley moves along the floor of the factory, and irregularities of the floor have no influence on the carriage position, since the trolley is free to move relative to the carriage means in vertical direction.

It is a further object of the present invention to improve this construction, and to connect the trolley and the carriage by adjustable means permitting the raising of the carriage to a position in which it can be placed on the rails of the spinning machine, while being transported by the trolley resting on the floor.

A related object of the present invention is to support the carriage only on the rails of the spinning machine, while the doffing means operate so that the trolley is free to move in vertical direction relative to the carriage as the trolley moves on an uneven floor.

My U.S. Patent 2,961,822 also discloses donning means mounted on the same carriage for placing new empty tubes on the spindles from which full bobbins have been removed.

It is yet an object of the present invention to provide means by which the supply of empty tubes to the donning means is controlled so that only a single tube is supplied to the donning means whenever the same pass over an empty spindle.

The automatic doffing apparatus of the present invention is mainly used in combination with a machine which has two upright portions at the ends thereof, and a connecting horizontal beam element between the upright portions. A row of upright spindles is supported on the connecting beam elements, and the spindles at the ends of the row defining, respectively, two spaces with the upright end portions of the machine. These spaces extend horizontally a certain distance which is selected by the designer of the machine.

One embodiment of the invention comprises a plurality of doffing means mounted on a carriage which is movable past the two spaces and the row of spindles. Each doffing means is dimensioned so that it can pass into the space between an end spindle and an upright end portion of the machine. The doffing means are mounted on the carriage for movement between an inoperative position spaced from the row of spindles and an operative position in which a pair of cam tracks thereon are respectively located on opposite sides of the spindles for successively engaging and raising bobbins on the spindles during movement of the carriage. Control means, preferably two cam members, are located in the region of each of the end spaces, and successively effect movement of each doffing means from the inoperative position to the operative position in the space before the first spindle, and from the operative position to the inoperative position in the space after the last spindle.

In the preferred embodiment of the present invention, all doffing means are turnably mounted on a shaft on the carriage, and are urged by spring means to the operative position, so that cam members have to be provided only at the ends of the machine for temporarily holding the doffing means in the inoperative position so that the doffing means may pass the upright end portions of the machine.

A holding member is preferably provided at least on the last trailing doffing means, and when the adjacent leading doffing means is moved at the end of the machine to its inoperative position, it actuates the holding member to move to a holding position for holding a bobbin which has been lifted off the respective spindle, preventing the respective bobbin from dropping forwardly into the empty space previously occupied by the adjacent leading doffing means in its operative position, and by a bobbin therein.

In the preferred embodiment of the present invention, the carriage on which the doffing means are supported, is connected to a trolley by a manually operated adjustable means. At the beginning of the operation, supporting members on the trolley raise the carriage to the level of rails on the spinning machine, and the wheels of the carriage are placed on the rails. Thereupon, the supporting members are lowered so that the carriage is supported only on the rails, while the trolley is free to move in vertical direction relative to the carriage as the trolley moves along an uneven floor.

One embodiment of the present invention comprises means for holding in a chute the first leading empty tube which is to be supplied to the donning means. When this means releases the first leading tube, another means is automatically operated to hold the second tube until the first means has returned to its holding position. In this manner, the feeding of two tubes is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a rear view of the doffing apparatus;

FIG. 3 is a side view of the doffing apparatus as viewed in the direction of the arrow 3 in FIG. 2;

FIG. 7 is a fragmentary side view illustrating the outside of the doffing means and holding means thereon;

FIG. 8 is a fragmentary sectional view taken on line 8—8, but drawn on a larger scale;

FIG. 9 is a fragmentary sectional view corresponding to FIG. 8 but illustrating another operational position of the holding means for a lifted-off bobbin;

FIG. 13 is a fragmentary rear view, partially in section, illustrating an arrangement for controlling the supply of empty tubes;

FIG. 14 is a sectional view taken on line 14—14 in FIG. 13;

Figure 1:
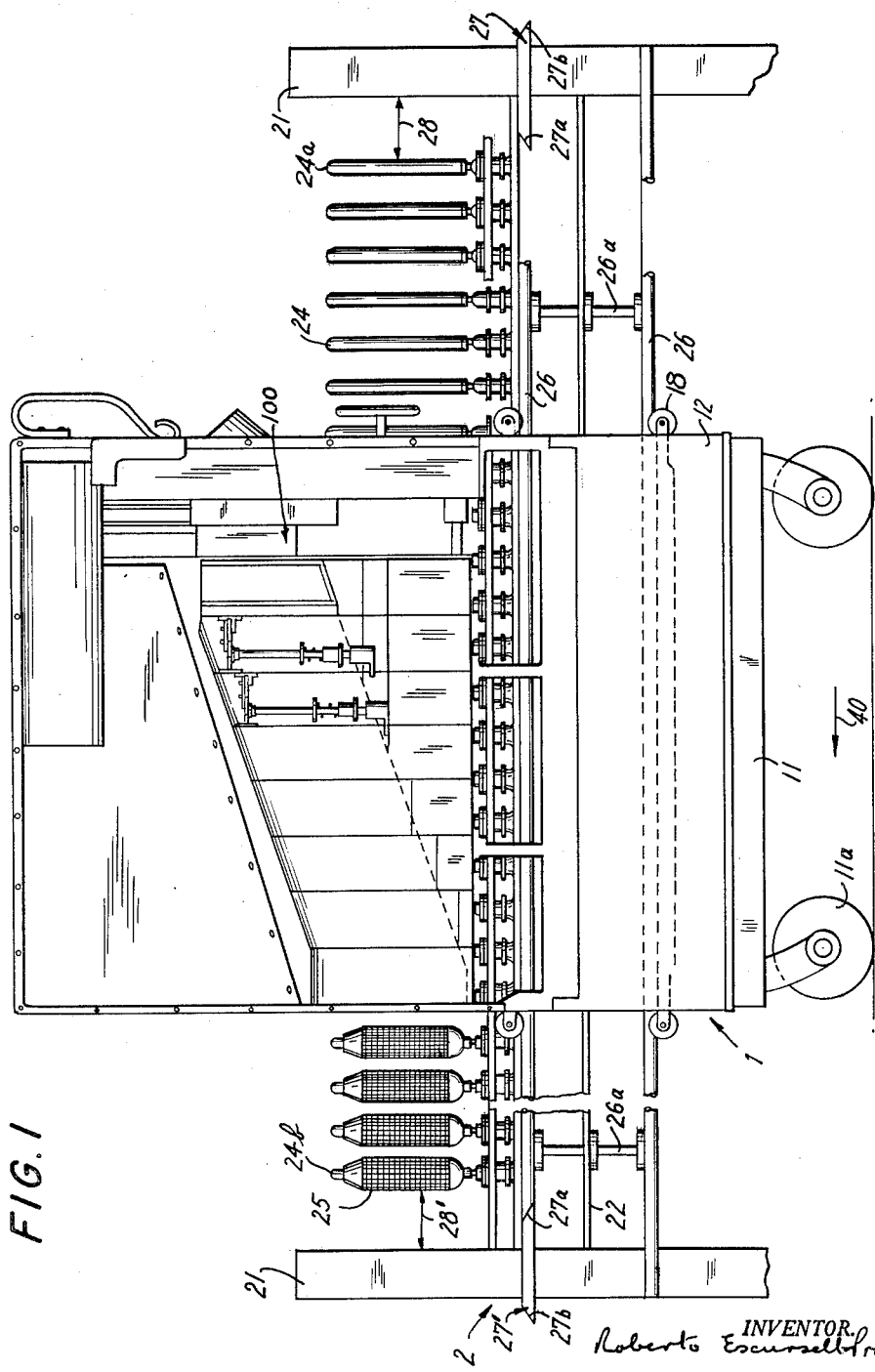
FIG. 1 is a side view illustrating a doffing apparatus according to the present invention, and a spinning machine on which the doffing operation is performed.

Referring now to the drawings, and more particularly to FIG. 1, a combined carriage and trolley means 1 is movable along a spinning machine 2 which includes two upright end portions 21 connected by a horizontal connecting beam 22 on which a row of spindles 23 is supported. Empty tubes 24 are placed on the spindles by donning means, which are not an object of the present invention, and yarn is wound on tubes 24 to form bobbins 25. Brackets 26a support a pair of horizontal rails 26 on the spinning machine. A pair of cam members 27 and 27' are mounted on the upright end portions 21 of the spinning machine, and have inwardly and outwardly tapering ends. The inwardly tapering ends 27a are located in the region of the spaces 28 and 28' adjacent the first tube 24a and the last tube 24b.

Figure 10:
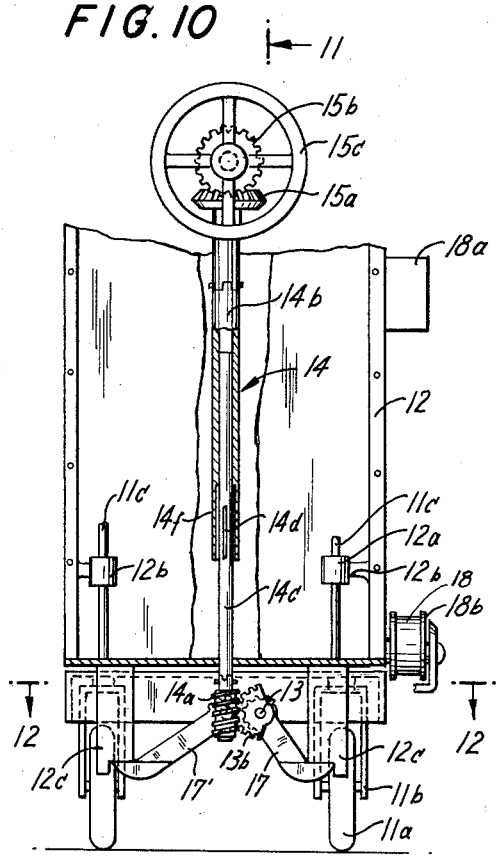
FIG. 10 is a rear view, partially in section, illustrating a carriage means according to the present invention.
Figure 11:
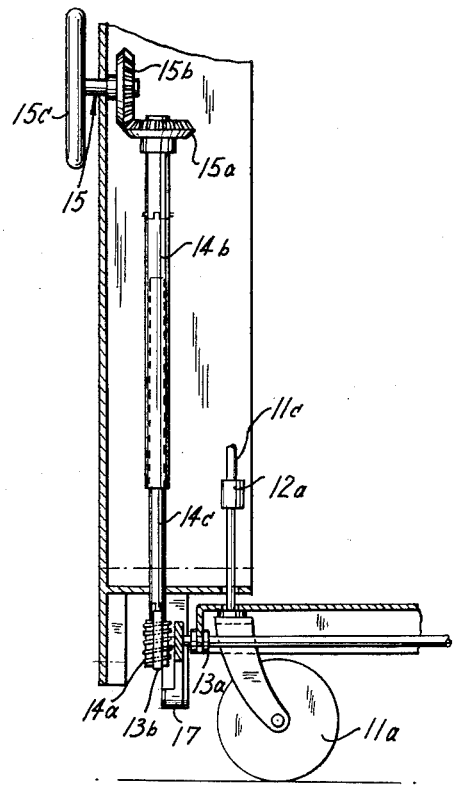
FIG. 11 is a fragmentary sectional view taken on line 11—11 in FIG. 10.
Figure 12:
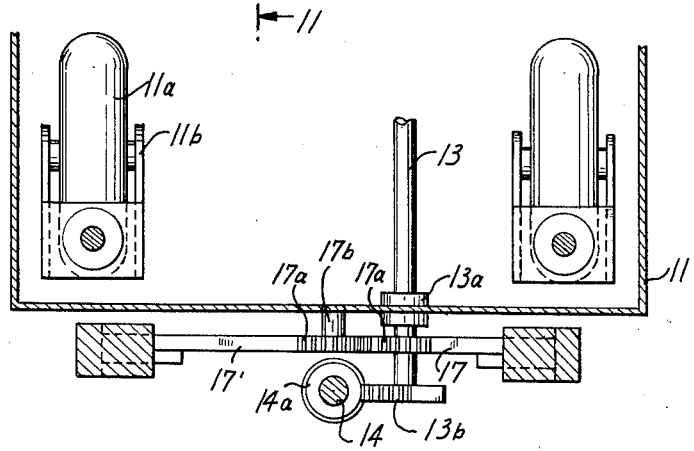
FIG. 12 is a fragmentary sectional view taken on line 12—12 in FIG. 10.

The combined carriage and trolley means 1 includes a trolley 11 having two pairs of wheels 11a, and a carriage 12 which is movable relative to the trolley 11 in vertical direction, but moves with the same as the trolley rolls along the floor. The construction of this device is best seen in FIGS. 10 to 12. Wheels 11a of trolley 11 are mounted in brackets 11b from which guide bars 11c project upwardly through corresponding cutouts in the bottom of carriage 12. Guide bars 11c are slidably guided in bearing sleeves 12a secured by brackets 12b to the walls of carriage 12. Consequently, carriage 12 can move in vertical direction relative to the trolley 11, but will move with the same as trolley 11 rolls along the floor. A shaft 13 is mounted in bearings 13a on the trolley 11, and has a worm gear 13b at one end thereof which meshes with a worm screw 14a on a telescopic element 14. Telescopic element 14 includes an upper part 14b and a lower part 14c which are connected to each other for turning movement by projections 14d and grooves 14f. The upper part 14b is mounted on the carriage 12 for turning movement, and is non-movable in the axial direction. The lower part 14c is longitudinally movable in the upper part 14b. A bevel gear 15a is secured to the upper end of part 14b and meshes with another bevel gear 15b which is turnably mounted on a wall of carriage 12, and connected by a shaft to a hand wheel 15c. When hand wheel 15c is manually turned, the upper part 14b will be turned, and effect turning of telescoping part 14c with worm screw 14a so that worm gear 13b and shaft 13 are turned. Two pairs of supporting lever members 17 and 17' are arranged at the front and rear ends of the trolley 11, only the pair of levers at the rear end of the trolley being illustrated in FIGS. 10 to 12. Each pair of supporting lever members includes a lever 17 fixed to shaft 13 and turning with the same. The other levers 17' are turnably mounted on a shaft 17b which is secured to trolley 11. Levers 17 and 17' of each pair have gear segments 17a meshing with each other so that lever members 17' turn simultaneously with lever members 17, and through the same angle, when operated by transmission means 13, 13b, 14a under control of the operating means 15.

FIGS. 10 and 11 show supporting levers 17 and 17' in a position engaging downwardly extending brackets 12c of carriage 12 so that carriage 12 is supported on trolley 11 slightly spaced therefrom as best seen in FIG. 11. By operation of hand wheel 15c, carriage 12 can be raised to a higher level with bearing sleeves 12a sliding on guide bars 11c.

Carriage 12 has two pairs of wheels 18 which may be partly covered by guards 18a. The arrangement of wheels 18 is best seen in FIGS. 1, 2 and 3, and particularly FIG. 1 shows that carriage 12 can be raised to a position in which wheels 18 are located at the level of rails 26.

The combined carriage and trolley means 1 is operated in the following manner: The device is pushed to a position in which it is located forwardly of the upright 21 of the spinning machine. In this position, hand wheel 15c is turned until wheels 18 are located exactly on the level of rails 26. The device can now be pushed so that the wheels 18 engage rails 26 from above and below, respectively, with the lateral wheel portions 18b partly embracing the sides of the rails.

The hand wheel 15c is now turned in the opposite direction, so that levers 17 and 17' move downwardly releasing supporting bracket 12c of carriage 12 which cannot follow the levers 17, 17' since carriage 12 is already fully supported on rails 26.

The operation of the device requires that carriage 12 is moved along rails 26 of the spinning machine, as will be described hereinafter in greater detail, and during such movement, wheels 11a of the trolley 11 moving over irregular portions of the floor will effect a corresponding vertical movement of trolley 11. Such movement of trolley 11 has no influence on the carriage 12, since guide bars 11c can slide in bearing sleeves 12a due to the fact that the end portions of levers 17 and 17' are spaced from supporting brackets 12c.

Before the device is pushed to a position in which wheels 18 of carriage 12 pass beyond the ends of rails 26 at the other end of the machine, the device is stopped, and hand wheel 15c is turned until the carriage 12 is again supported on levers 17 and 17'. When wheels 18 are then separated from rails 26, carriage 12 cannot drop on trolley 11. Handles 19, best seen in FIGS. 2 and 3, are secured to the upper part of carriage 12 to facilitate the pushing of the device to the end portion of the machine, and along the rails 26.

Figure 4:
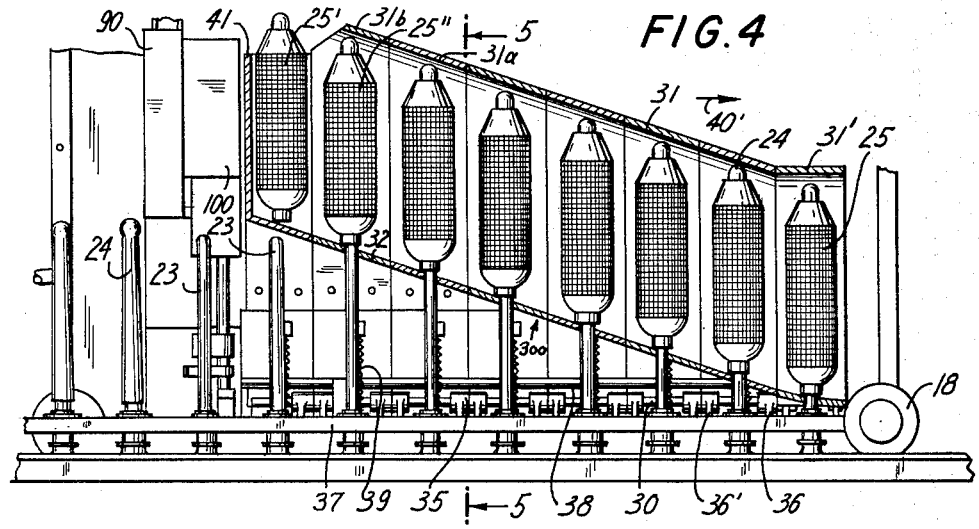
FIG. 4 is a fragmentary longitudinal sectional view of the doffing apparatus taken on line 4—4 in FIG. 2, and also showing spindles of the spinning machine.
Figure 5:
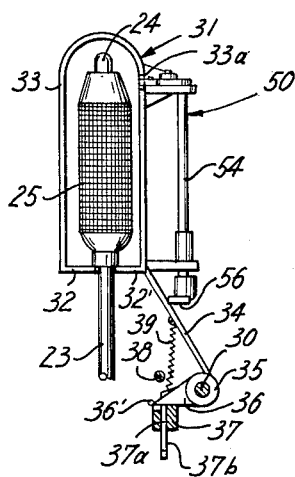
FIG. 5 is a fragmentary cross-sectional view taken on line 5—5 in FIG. 4 and illustrating a doffing means in its operative position.
Figure 6:
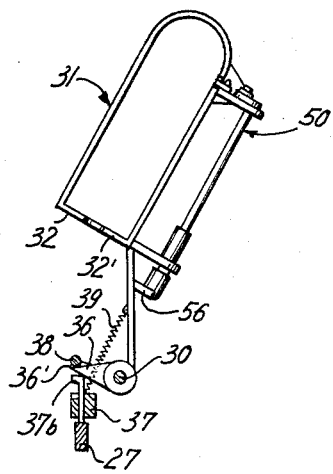
FIG. 6 is a cross-sectional view corresponding to FIG. 5 but ilustrating a doffing means in its inoperative position.

As shown in FIGS. 1 to 6, a shaft 30 is mounted on the carriage means 12 and supports a plurality of doffing means 31 for turning movement between an operative position shown in FIG. 5, and an inoperative position shown in FIG. 6. Each doffing means includes a pair of cam track members 32 and 32' which are spaced from each other a distance corresponding to the thickness of a spindle 23 permitting a spindle 23 to pass between the cam tracks 32 and 32' in the operative position shown in FIG. 5. Cam tracks 32 and 32' are connected by a U-shaped connecting member 33 which is dimensioned to permit passage of a tube 24 and a wound bobbin 25 thereon when the base of the bobbin rests on the cam track members 32, 32'. One leg of the U-shaped connecting member 33 has a bracket extension 34 provided with a pair of bearing members 35 through which shaft 30 passes. Since the cam track members 32, 32' are located at different heights, the bracket extensions are of different length so that all bearing members are located at the same horizontal level at which shaft 30 extends. One bearing member 35 has a triangular stop member 36 projecting therefrom which in the operative position shown in FIG. 5 abuts a stop bar 37, while in the inoperative position shown in FIG. 6 a stop member 36' on the other bearing member abuts another stop bar 38. The ends of stop bars 37 and 38 are secured to carriage 12, and all triangular stop members 36 are located on the same horizontal level. A spring 39 is secured to bracket 34 of each doffing means 31 and to stop bar 37 and urges the doffing means to turn to its operative position illustrated in FIG. 5.

When the carriage 12 is moved in the direction of arrow 40 in FIG. 1, the doffing means 31 move in the direction of arrow 40' in FIG. 4. In the illustrated operative position, the cam track members 32 and 32' are located on opposite sides of the spindles 23 and form a composite cam track by which the bobbins 25 are first loosened, and then raised to the position of the bobbin 25' which is located above the upper end of the respective spindle 23 and opposite the chute 41, also shown in FIGS. 7 to 9, through which the doffed bobbin drops into the interior of the carriage 12.

Since the loosening of each bobbin on the respective spindle 23 requires a far greater force than the raising of the bobbins on the spindles 23, the cam track members 32, 32' of the first doffing means 31', have a lesser inclination than the cam track members 32, 32' of the trailing doffing means 31.

Donning means generally indicated by the reference numeral 100 in FIG. 1, are provided for placing an empty tube 24 on each spindle 23 from which a full bobbin was doffed. The construction of the composite cam track 300 of the doffing means 31, and the construction of the donning means is disclosed in my copending application, and not an object of the present invention.

Due to the fact that the spinning machine is provided with end portions 21 which are aligned with the spindles, it is not possible to move the doffing means 31 into alignment with the spindles 23 while the doffing means are in the operative position shown in FIG. 5. In the inoperative position shown in FIG. 6, the U-shaped connecting members 33 are laterally displaced, so that they can pass the end members 21 of the spinning machine while the wheels 18 of carriage 12 roll on rails 26. When the first leading doffing means 31' passes the space 28 between the first bobbin 25 and the end member 21, it is necessary to pivot the first leading doffing means 31' from the inoperative position shown in FIG. 6 to the operative position shown in FIG. 5. Thereupon the carriage is advanced one step until the leading doffing means 31 is located in the region of the second bobbin while the adjacent trailing doffing means 31 is located opposite the space 28. In this position, the second doffing means 31 is pivoted from the inoperative position shown in FIG. 6 to the operative position shown in FIG. 5, and the operation is successively repeated until the last trailing doffing means 31 and the trailing chute means 41 have been turned into the operative position aligned with the rows of spindles.

Thereupon, the carriage 12 is moved along rails 26, while all bobbins are successively loosened, raised on composite cam track 300, and finally fall through chute 41 into the interior of carriage 12. When the leading doffing means 31 arrives at the space 28' at the far end of the machine, it must be pivoted into its inoperative position as shown in FIG. 6 so that it may pass the upright member 21. As the doffing means, and finally chute 41 successively arrive at the space 28', they are successively turned to the inoperative position until all doffing means have passed the end member 21, and carriage 12 is moved beyond the end of the machine.

In accordance with the present invention, the pivotal movement of the doffing means 31 between inoperative and operative position is accomplished by a pair of cams 27 and 27'. The stop bar 37 has a plurality of vertical slots 37a located directly below the triangular members 36 of each doffing means 31. A cam follower member 37b is slidably mounted in each slot 37a and is movable between the lower position shown in FIG. 5 and the higher position shown in FIG. 6. Since each cam follower 37b is located underneath a projecting member 36, raising of a cam follower 37b will effect movement of the respective doffing means from the operative position shown in FIG. 5 to the inoperative position shown in FIG. 6. Cam members 27 and 27' cooperate with cam followers 37b of each doffing means 31. When the wheels 18 of carriage 12 are not guided on rails 26, springs 39 hold the doffing means 31 in the operative position shown in FIG. 5, with projection 36 abutting bar 37. In this condition, the trolley 12 is pushed toward the end member 21 of the machine, and the wheels of carriage 12 are placed on rails 26. When the first doffing means 31' arrives in the region of the end member 21, the end portion 27b of cam 27 engages the first cam follower 37b and raises the same so that the doffing means is automatically turned to the inoperative position and passes end member 21. When the doffing means has arrived at the space 28 adjacent end member 21, cam follower 37 passes over the tapering end portion 27a of cam 27 so that the doffing means 31' is released and is urged by spring 39 to turn to its operative position located in space 28 with cam tracks 32 and 32' located on opposite sides of a plane of symmetry passing through the row of spindles 23.

As the carriage 12 is pushed along rails 26, each doffing means 31 is first pivoted by cam portion 27b and cam follower 37b to the angularly displaced inoperative position to pass end member 21, and is then urged by spring 39 into its operative position located in space 28. The stop bar 38 limits the turning movements of each doffing means so that springs 39 do not have to support the full weight of the doffing means in the inoperative position. The carriage with the doffing means is moved along the row of spindles until all bobbins are doffed. When the leading doffing means 31' arrives at the space 28', cam portion 27a of cam member 27' engages the respective cam follower 37b and turns the leading doffing means 31' to its inoperative position in which it passes the other end member 21. When the same has been passed by the doffing means 31', cam portion 27b of cam member 27' releases cam follower 37b so that spring 39 returns the doffing means 31' to its normal position shown in FIG. 5. The operation is repeated as each doffing means 31 passes space 28'.

Hand wheel 15c may now be operated to again support carriage 12 on trolley 11, whereupon the carriage and the trolley are pushed beyond the end of rail 26 and may be rolled to another spinning machine.

During the movement of the doffing means along the row of spindles, all bobbins 25 and tubes 24 are guided on the spindles, except the last bobbin 25' in the chute member 41. Bobbin 25' must transversely drop into the chute 41a, see FIG. 8, and cannot drop into the region of the adjacent doffing means 31 because the bobbin 25" is still rigidly held on the respective spindle 23 in a vertical position. When the doffing means 31 move slightly further in a direction of the arrow 40' in FIG. 4, bobbin 25" is raised above the upper end of spindle 23 and will be located at the trailing end of the respective cam track member 32 without any lateral support except the adjacent leading bobbin 25 which is still supported on a spindle 23. As long as doffing means 31 move along the row of spindles, a bobbin 25 in a leading doffing means which is still on a spindle 23 will prevent the toppling over of a bobbin 25 in a trailing doffing means 25" which has been lifted off the respective spindle. However, when doffing means 31a arrives at space 28' where there is no spindle 23, tube 24 and bobbin 25 and is turned to its inoperative position, there is nothing in space 28' which could support bobbin 25" in doffing means 31b when bobbin 25" is lifted off the respective spindle 23. Consequently, bobbin 25" may fall into space 28', and bobbin 25' may follow instead of dropping into chute 41a. Since carriage 12 moves in the direction of arrow 40 in FIG. 1 and of arrow 40' in FIG. 4, doffing means 31a and 31b are the last to arrive in space 28'. When doffing means 31a arrives at space 28', all other doffing means 31 are already empty and have been turned into the inoperative position of FIG. 6 to pass the end member 21. When doffing means 31a moves into space 28', the bobbin on tube 24b stays on the last spindle 23.

In accordance with the present invention, holding means 50, best seen in FIGS. 5 to 9, are provided on doffing means 31a and 31b. A bracket 52 is secured to each U-shaped connecting portion 33 of doffing means 31a and 31b, and turnably supports an angular lever 51 in the region of the upper end of U-shaped connecting member 33 and opposite a slot 33a in the same. A pair of brackets 53 and 53' supports a vertical shaft 54 biased by a torsion spring 54a which carries at its upper end a fixed arm 55, and at its lower end a fixed feeler arm 56. A link 57 is articulated to arm 55 and to one end of lever 51.

Each feeler arm 56 has one end located in the region of the adjacent leading doffing means, for example, the feeler arm 56 of doffing means 31b is located in the region of doffing means 31a.

As long as the trailing doffing means are aligned as shown in FIG. 8, each feeler lever 56 engages the extension bracket 34 of the next leading doffing means 31 under the action of torsion spring 54a, and the holding levers 51 are in the inoperative position located outside of the respective doffing means and in the respective slot 33a, as shown in FIG. 8. When the doffing means 31 leading doffing means 31a is shifted to its inoperative position, lever 56 of the holding means of doffing means 31a is turned to the position shown in FIG. 9, and effects turning of holding lever 51 to its operative position projecting into doffing means 31a and holding bobbin 25" upright so that it cannot drop into doffing means 31a when it is lifted off the respective spindle 23. The thus held bobbin 25" also constitutes a support for the bobbin 25' which is already located in chute 41. When the doffing means move further in direction of the arrow 40' in FIG. 4 and in direction of the arrow 40" in FIG. 9, doffing means 31a will be turned to its inoperative position, and its holding lever 51 will be restored to its initial inoperative position. At the same time, however, feeler lever 56 of doffing means 31b will be actuated, and turn the associated holding lever 51 to its operative position for holding the bobbin 25" which will then be located in chute 41 in the position shown for bobbin 25' in FIG. 9. When doffing means 31, 31a, 31b successively arrive at cam 27 at the beginning of the operation, They are successively pivoted to the inoperative position shown in FIG. 6 to pass end member 21, and then pivot back to the operative position of FIG. 5 when aligned with space 28. Levers 56 will be operated and turn holding levers 51 successively to the operative position located in the doffing means. Since there are not yet bobbins in the doffing means, holding levers 51 will be idle. When the doffing means assume the operative position in space 28, torsion spring 54a returns the holding lever 51 to the inoperative position.

In my U.S. Patent 2,961,822, a donning means is disclosed which serves the purpose of controlling the passage of empty tubes 24 through the chute 90 so that a new tube or empty bobbin is placed on each spindle 23 from which the donning means have removed a full bobbin. The donning means is not an object of the present invention, and is generally indicated by the reference numeral 100 in FIGS. 1, 3 and 4. Empty bobbins are supplied through a chute which includes an upper part 93, best seen in FIGS. 13 to 17, a lower curved chute part 91, best seen in FIGS. 2, 3, 14 and 17, and a transversely directed outlet portion 90, best seen in FIGS. 2, 3 and 4. The chute means and the donning means as well as other parts which will be discussed in detail with reference to FIGS. 13 to 17 hereinafter, are all mounted on a unit including a long leg 62 terminating in a closed hook portion 62a which embraces a shaft 63 mounted in carriage 12, as best seen in FIGS. 2 and 3. A latch 66 is pivotally mounted on leg 62, and tends to assume a position engaging a catch 67 for holding the entire unit in an operative position in which chute 90 projects through an opening in the walls of carriage 12 so that the end portion 90 of the chute is aligned with the row of spindles 23 whereby empty bobbins dropping out of outlet 90 fall onto corresponding spindles 23 from which a full bobbin has just been donned.

As is evident from FIG. 2, parts of the unit, and particularly parts of the chute 90, would interfere with the end portions 21 of the spinning machine, and consequently the entire unit 70 is pivotable about shaft 63 to an inoperative position corresponding to the position of the doffing means shown in FIG. 6. In this inoperative position, the chute portion 90 is transversely displaced relative to the end portions 21 of the spinning machine, and consequently does not interfere with the movement of the carriage along the rails. When the donning unit 70 passes space 28, it is automatically pivoted into the operative position shown in FIGS. 2 and 3.

Latch 66 has a transverse projection 65 which is located directly above a cam follower 64 mounted in a guide slot of bar 37 for vertical movement. When cam 27 engages cam follower 64, it shifts latch 66 to a releaving position abutting a fixed stop 67a on leg 62 so that the entire unit performs a pivotal movement about shaft 63 to its inoperative position until leg 62 abuts a stop 62b on carriage 12. Since the unit is constructed to have its center of gravity on the right of shaft 63, so that cams 27 and 27' would have to shift a considerable weight, such movement may be aided by a spring 62c which counterbalances part of the turning moment of the unit. When cam follower 64 is again released by cam 27, or cam 27', unit 70 will tend to return to its operative position under the action of the force of gravity, and in such operative position, latch 66 will be hooked into catch 67 for holding the unit 70 rigidly in the operative position.

Figure 17:
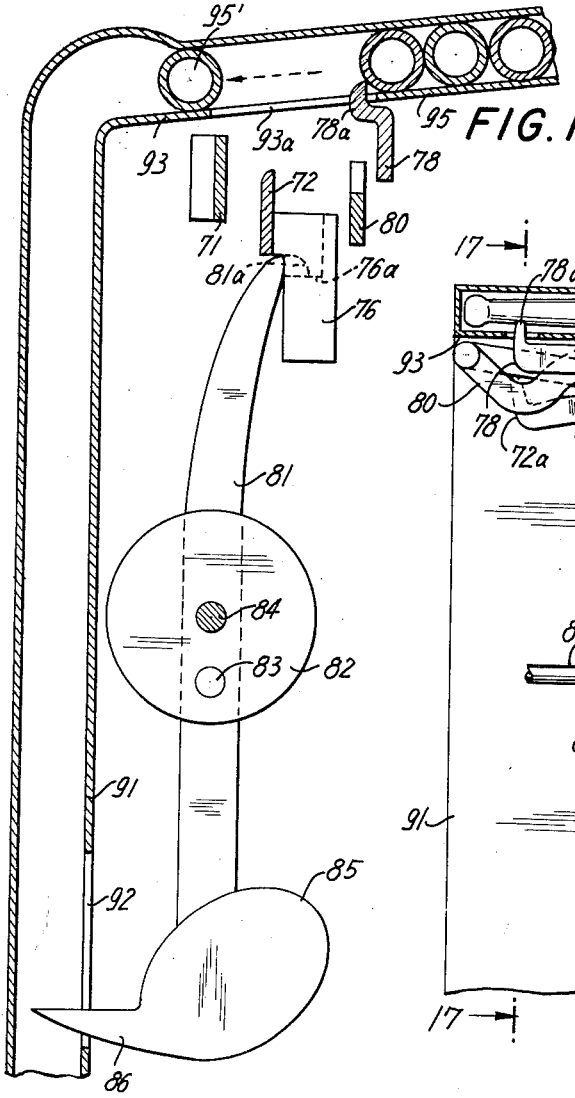
FIG. 17 is a fragmentary sectional view taken on line 17—17 in FIG. 16, corresponding to FIG. 14 but illustrating another operational position.
Figure 16:
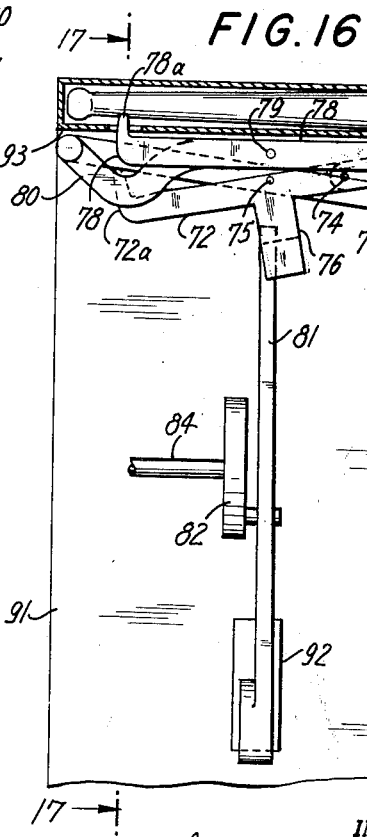
FIG. 16 is a fragmentary rear view corresponding to FIG. 13 but illustrating another operational position of the apparatus.

A magazine for empty bobbins 95 may be provided on top of carriage 12, and empty bobbins 95 are supplied from the magazine to the upper chute part 93, as best seen in FIGS. 14 and 17. The empty bobbins 95 would all roll into the curved lower chute part 91 and may clog the same. In accordance with the present invention, means are provided for assuring that single bobbins 95 are fed into chute part 91, and moreover for assuring that bobbins 95 are only supplied to the curved chute part 91 when the upper portion thereof is empty. In this manner, a constant supply of empty bobbins to the outlet 90 is obtained.

Two pairs of stop levers are provided for this purpose. The first pair of stop levers 71 and 72 have projections 71a and 72a passing through cutouts 93a in the bottom plate of the upper chute part 93. Pivot means 75 connect levers 71 and 72, so that the same move in scissor-like motion. Lever 72 is mounted on a pivot 74 on a rigid arm 73, while lever 71 is longer and mounted on a pivot means 94. A coupling member 76 is secured to lever 72 and has a slot 76a cooperating with the hook-shaped end 81a of a feeler lever 81 which is rockably mounted on an eccentric pin 83 on a disc 82. The lower end of feeler lever 81 has a weight means 85 and terminates in a feeler finger 86 projecting through a slot 92 in chute portion 91. In the event that chute portion 91 is filled with empty bobbins, feeler finger 86 is urged out of slot 92 against the action of the weight 85 and in this event feeler lever 81 is turned to a position in which its upper hook 81a is located spaced from slot 76a in coupling member 76.

Disc 82 is driven by shaft 84 which is connected by bevel gears 87, a shaft 88, other bevel gears 87a, and a shaft 89 to one of the wheels 18 of carriage 12. Consequently, as carriage 12 moves along rails 26, the eccentric member 82, 83 will be rotated, and lever 81 will move between a higher position and a lower position. If feeler finger 86 is located in chute 91, the higher position will be the position shown in FIG. 14, and the lower position will be the position shown in FIG. 17. During movement from the position of FIG. 14 to the position of FIG. 17, hook 81 engages coupling member 76, and lowers lever 72, so that lever 71 follows due to the pivot connection 75, and both stops 71a and 72a are retracted from the upper chute portion 93. In the event that chute portion 91 is filled with empty bobbins, projection 81a of lever 81 would move at a distance from member 76, and could not shift the first step levers 71 and 72.

Adjacent the first stop levers 71 and 72, a second pair of stop levers 78 and 80 are located, which are turnably mounted on pivot means 94, and connected by pivot 79. Stop levers 78 and 80 have projections 78a and 80a, respectively, which are normally located in the position shown in FIG. 14, but can be shifted to the position shown in FIG. 17 in which projections 78a and 80a project through the cutouts 93a into the region of the second leading bobbin 95. Stop lever 72 has an end portion projecting beyond pivot 74 and connected by another pivot 77 to stop lever 78. Consequently, when stop levers 71, 72 are actuated by coupling feeler means 81, 76 to move to the lower position shown in FIG. 17 in which the leading bobbin 95' is released by projections 71a, 72a, stop levers 78, 80 will perform an opposite scissor-like movement until projections 78a and 80a project through cutouts 93a into the path of the second leading bobbin 95 retaining the same while the first leading bobbin 95' rolls into the lower chute portion 91.

Figure 15:
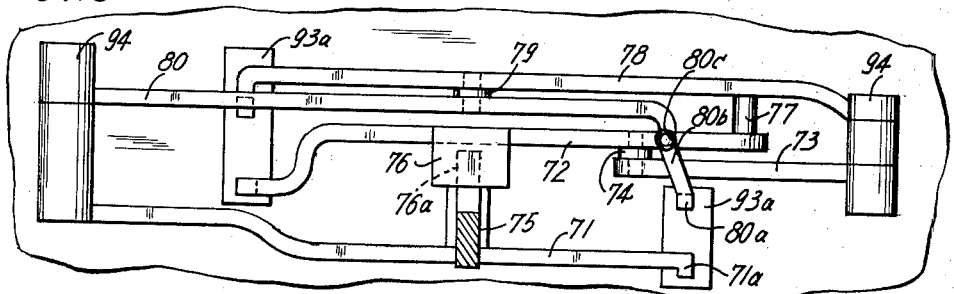
FIG. 15 is a fragmentary bottom view taken on line 15—15 in FIG. 13.

Lever 80 has a transverse curved part 80b, best seen in FIGS. 13 and 15, which crosses lever 72 and rigid support 73 without interfering with the same during the pivotal lever movements. A spring 80c is secured to portion 80b, and urges the second stop levers to assume the normal inoperative position shown in FIGS. 13 and 14. When the drive means 82, 83, 84, 87, 88, 89, 18 are coupled by coupling feeler means 81, 76 to the first pair of stop lever means 71, 72, the force of spring 80c is overcome, and stop projections 71a, 72a are lowered, while stop projections 78a and 80a are raised.

The pair of stop projections 78a and 80a are staggered relative to each other, as are the stop projections 71a and 72a. This is necessitated by the conical shape of the bobbins 95 which are thus held in position in which the axes thereof extend perpendicular to the direction of movement of the bobbins.

It will be understood that each of the elements described above, or two or more together, may also find a useful application in other types of doffing and donning apparatus differing from the types described above.

While the invention has been illustrated and described as embodied in an automatically operated doffing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In combination with a machine having two upright portions, a connecting element between said portions, and a row of upright spindles supported on said connecting element, the spindles at the ends of the row and said upright portions defining two spaces extending a selected distance in the direction of said connecting element; carriage means movable along said machine first past one of said spaces, then along said row of spindles, then past the other of said spaces; a plurality of doffing means mounted on said carriage means for movement with the same, each doffing means extending in the direction of said connecting element a distance smaller than said selected distance, each doffing means being mounted on said carriage means for movement between an inoperative position located spaced from the row of spindles and an operative position in which said doffing means are aligned with said row of spindles for successively engaging and raising bobbins on the spindles during movement of said carriage means; and control means located in the region of each of said spaces and successively operatively engageable with each doffing means which is located opposite said spaces during movement of said carriage means for effecting movement of the respective doffing means from said inoperative position to said operative position when the respective means passes said one space, and from said operative position to said inoperative position when the respective doffing means passes said other space.

2. In combination with a machine having two upright portions, a connecting element between said portions, and a row of upright spindles supported on said connecting element, the spindles at the ends of the row and said upright portions defining two spaces extending a selected distance in the direction of said connecting element; carriage means movable along said machine first past one of said spaces, then along said row of spindles, then past the other of said spaces; a plurality of doffing means mounted on said carriage means for movement with the same, each doffing means including a pair of inclined spaced cam track members and extending in the direction of said connecting element a distance smaller than said selected distance, each doffing means being mounted on said carriage means for movement between an inoperative position located spaced from the row of spindles and an operative position in which said cam track members are located on opposite sides of the spindles for successively engaging and raising bobbins on the spindles during movement of said carriage means; and control cam means located in the region of each of said spaces and successively operatively engageable with each doffing means which is located opposite said spaces during movement of said carriage means for effecting movement of the respective doffing means from said inoperative position to said operative position when the respective means passes said one space, and from said operative position to said inoperative position when the respective doffing means passes said other space.

3. In combination with a machine having two upright portions, a connecting element between said portions, and a row of upright spindles supported on said connecting element, the spindles at the ends of the row and said upright portions defining two spaces extending a selected distance in the direction of said connecting element; carriage means movable along said machine first past one of said spaces, then along said row of spindles, then past the other of said spaces; a plurality of doffing means mounted on said carriage means for movement with the same, each doffing means including a pair of inclined spaced cam track members and extending in the direction of said connecting element a distance smaller than said selected distances, each doffing means being mounted on said carriage means for transverse turning movement between an inoperative position located angularly spaced from the row of spindles and an operative position in which said cam track members are located on opposite sides of the spindles for successively engaging and raising bobbins on the spindles during movement of said carriage means; and control cam means located in the region of each of said spaces and successively operatively engageable with each doffing means which is located opposite said spaces during movement of said carriage means for effecting movement of the respective doffing means from said inoperative position to said operative position when the respective means passes said one space, and from said operative position to said inoperative position when the respective doffing means passes said other space.

4. In combination with a machine having two upright portions, a connecting element between said portions, and a row of upright spindles supported on said connecting element, the spindles at the ends of the row and said upright portions defining two spaces extending a selected distance in the direction of said connecting element; carriage means movable along said machine first past one of said spaces, then along said row of spindles, and then past the other of said spaces; a plurality of doffing means mounted on said carriage means for movement with the same, each doffing means including a pair of inclined spaced cam track members and extending in the direction of said connecting element a distance smaller than said selected distance, each doffing means being mounted on said carriage means for transverse turning movement between an inoperative position located angularly spaced from the row of spindles and an operative position in which said cam track members are located on opposite sides of the spindles for successively engaging and raising bobbins on the spindles during movement of said carriage means; spring means on said carriage means connected to said doffing means for urging the same into said operative position; and control cam means including two cam members respectively located in the region of said upright portions and terminating in the region of said spaces, said cam members being successively operatively engageable with each doffing means which is located opposite said spaces during movement of said carriage, one of said cam members causing movement of the doffing means by said spring means from said inoperative position to said operative position when the respective doffing means passes said one space, and the other cam member effecting movement of the doffing means from said operative position to said inoperative position against the action of said spring means when the respective doffing means passes said other space.

5. In combination with a machine having two upright portions, a horizontal connecting element between said portions, and a row of upright spindles supported on said connecting element, the spindles at the ends of the row and said upright portions defining two spaces extending a selected distance in the direction of said connecting element; carriage means movable along said machine first past one of said spaces, then along said row of spindles, and then past the other of said spaces, said carriage means including a horizontal bar formed with a plurality of transverse guide slots; a plurality of shiftable members respectively mounted in said guide slots for movement between a lower inoperative position and a higher actuated position; a plurality of doffing means mounted on said carriage means for movement with the same, each doffing means including a pair of inclined spaced cam track members and extending in the direction of said connecting element a distance smaller than said selected distance, each doffing means being mounted on said carriage means for transverse turning movement between an inoperative position located angularly spaced from the row of spindles and an operative position in which said cam track members are located on opposite sides of the spindles for successively engaging and raising bobbins on the spindles during movement of said carriage means, each doffing means having a part located above one of said shiftable members, respectively, said part being engaged by the respective correlated shiftable member moving to said actuated position thereof for moving the respective doffing means to said inoperative position; spring means on said carriage means connected to said doffing means for urging the same into said operative position; and control cam means including two cam members respectively located in the region of said upright portions and terminating in the region of said spaces, said cam members successively engaging said shiftable members whose correlated doffing means are located opposite said spaces during movement of said carriage, one of said cam members tapering to permit movement of each shiftable member to said inoperative position thereof and movement of the respective doffing means to said operative position when the respetcive doffing means passes said one space, and the other cam member having a rising portion to move each shiftable member to said actuated position thereof to effect movement of the respective doffing means to said inoperative position when the respective doffing means passes said other space.

6. In combination with a machine having two upright portions, a connecting element between said portions, and a row of upright spindles supported on said connecting element, the spindles at the ends of the row and said upright portions defining two spaces extending a selected distance in the direction of said connecting element; carriage means movable along said machine first past one of said spaces, then along said row of spindles, and then past the other of said spaces; a plurality of doffing means mounted on said carriage means for movement with the same, each doffing means including a pair of inclined spaced cam track members and extending in the direction of said connecting element a distance smaller than said selected distance, said cam track members of said doffing means defining together a composite cam track having in the direction of movement of said carriage means a trailing portion located higher than the upper ends of the spindles so that a bobbin supported on the pair of cam track members of at least the last trailing doffing means is lifted off the respective spindle, each doffing means being mounted on said carriage means for movement between an inoperative position located spaced from the row of spindles and an operative position in which said cam track members are located on opposite sides of the spindles for successively engaging and raising bobbins on the spindles during movement of said carriage means; a holding member mounted on said last trailing doffing means for movement between an inoperative position and a holding position for holding a bobbin supported on the respective cam track members and lifted off the respective spindle; an operating member mounted on said last trailing doffing means and projecting into the region of the adjacent doffing means leading said last trailing doffing means, said operating member being operatively connected to said holding member and being engaged and shifted by said adjacent leading doffing means to shift said holding member from said inoperative position to said holding position when said adjacent leading doffing means moves from said operative position to said inoperative position; and control means located in the region of each of said spaces and successively operatively engageable with each doffing means which is located opposite said spaces during movement of said carriage means for effecting movement of the respective doffing means from said inoperative position to said operative position when the respective doffing means passes said one space, and from said operative position to said inoperative position when the respective doffing means passes said other space.

7. An apparatus as set forth in claim 6 and including another holding member mounted on said adjacent leading doffing means; another operating member mounted on said adjacent leading doffing means and projecting into the region of the leading doffing means adjacent thereto, said other operating member being operatively connected to said other holding member and engaged and shifted by said leading doffing means adjacent thereto when the same moves to said inoperative position.

8. An apparatus as set forth in claim 6, wherein said holding member is turnably mounted at the upper end of said last trailing doffing means so as to engage the upper end of a bobbin; wherein said operating member is turnably mounted at the lower end of said last trailing doffing means; and including a vertical shaft means and lever means operatively connecting said operating member with said holding member for turning movement.

9. In combination with a machine having two upright portions, a connecting element between said portions, and a row of upright spindles supported on said connecting element, the spindles at the ends of the row and said upright portions defining two spaces extending a selected distance in the direction of said connecting element; carriage means movable along said machine first past one of said spaces, then along said row of spindles, and then past the other of said spaces; a plurality of doffing means mounted on said carriage means for movement with the same, each doffing means including a pair of inclined spaced cam track members and a U-shaped connecting portion connecting said cam track members, said U-shaped connecting portion being located above said cam track members and extending in the direction of said connecting element a distance smaller than said selected distance, each U-shaped connecting portion having a lateral slot, said cam track members of said doffing means defining together a composite cam track having in the direction of movement of said carriage means a trailing portion located higher than the upper ends of the spindles so that a bobbin supported on the pair of cam track members of at least the last trailing doffing means is lifted off the respective spindle while being located within said U-shaped connecting portion, each doffing means being mounted on said carriage means for transverse turning movement between an inoperative position located angularly spaced from the row of spindles and an operative position in which said cam track members are located on opposite sides of the spindles for successively engaging and raising bobbins on the spindles during movement of said carriage means; a holding member mounted on said last trailing doffing means for movement between an inoperative position located outside of said U-shaped connecting portion and a holding position projecting through said lateral slot into the interior of said U-shaped connecting portion for holding in upright position a bobbin supported on the respective cam track members and lifted off the respective spindle; an operating member mounted on said last trailing doffing means and projecting into the region of the adjacent doffing means leading said last trailing doffing means, said operating member being operatively connected to said holding member and being engaged and shifted by said adjacent leading doffing means to shift said holding member from said inoperative position to said holding position when said adjacent leading doffing means moves from said operative position to said inoperative position; and control cam means located in the region of each of said spaces and successively operatively engageable with each doffing means which is located opposite said spaces during movement of said carriage means for effecting movement of the respective doffing means from said inoperative position to said operative position when the respective means passes said one space, and from said operative position to said inoperative position when the respective doffing means passes said other space.

10. An apparatus as set forth in claim 9 wherein said holding member is a lever turnably mounted at the upper end of said last trailing doffing means so as to engage the upper end of a bobbin; wherein said operating member is a lever turnably mounted at the lower end of said last trailing doffing means; and including a vertical shaft means and lever means operatively connecting said operating member with said holding member for turning movement.

11. In combination with a machine having two upright portions, a horizontal connecting element between said portions, and a row of upright spindles supported on said connecting element, the spindles at the ends of the row and said upright portions defining two spaces extending a selected distance in the direction of said connecting element; horizontal rail means extending along said upright portions and said connecting element; a carriage guided on said rail means for movement in one direction past one of said spaces, then along said row of spindles, and then past the other of said spaces; trolley means adapted to move on a floor along the machine; means for mounting said carriage on said trolley means for relative movement in vertical direction and for movement with said trolley means along said rail means; adjustable means connecting said trolley means with said carriage and including operating means for moving said carriage and said trolley means toward and away from each other in vertical direction whereby said carriage can be raised to the level of said rail means while said trolley means is supported on the floor; a plurality of doffing means mounted on said carriage means for movement with the same, each doffing means extending in the direction of said connecting element a distance smaller than said selected distance, each doffing means being mounted on said carriage means for movement between an inoperative position located spaced from the row of spindles and an operative position in which said doffing means are aligned with said row of spindles for successively engaging and raising bobbins on the spindles during movement of said carriage means; and control means located in the region of each of said spaces and successively operatively engageable with each doffing means which is located opposite said spaces during movement of said carriage means for effecting movement of the respective doffing means from said inoperative position to said operative position when the respective means passes said one space, and from said operative position to said inoperative position when the respective doffing means passes said other space.

12. In combination with a machine having two upright portions, a horizontal connecting element between said portions, and a row of upright spindles supported on said connecting element, the spindles at the ends of the row and said upright portions defining two spaces extending a selected distance in the direction of said connecting element; horizontal rail means extending along said upright portions and said connecting element; a carriage guided on said rail means for movement in one direction past one of said spaces, then along said row of spindles, and then past the other of said spaces; trolley means adapted to move on a floor along the machine; means for mounting said carriage on said trolley means for relative movement in vertical direction and for movement with said trolley means along said rail means; adjustable means connecting said trolley means with said carriage and including a telescopic element turnably supported on said carriage and having telescoping parts connected to each other for turning movement, manually operated means operatively connected to one of said telescopic parts for turning the same, connecting means mounted on said trolley means for turning movement and including supporting members supporting said carriage, and transmission means connecting another part of said telescopic element with said connecting means so that turning of said telescopic element by said manually operated means effects raising or lowering of said carriage whereby said carriage whereby said carriage can be raised to the level of said rail means while said trolley means is supported on the floor and whereby said supporting members can be operated to release said carriage so that said carriage can move vertically relative to said trolley means; a plurality of doffing means mounted on said carriage means for movement with the same, each doffing means including a pair of inclined spaced cam track members and extending in the direction of said connecting element a distance smaller than said selected distance, each doffing means being mounted on said carriage means for movement between an inoperative position located spaced from the row of spindles and an operative position in which said cam track members are located on opposite sides of the spindles for successively engaging and raising bobbins on the spindles during movement of said carriage means; and control means located in the region of each of said spaces and successively operatively engageable with each doffing means which is located opposite said spaces during movement of said carriage means for effecting movement of the respective doffing means from said inoperative position to said operative position when the respective means passes said one space, and from said operative position to said inoperative position when the respective doffing means passes said other space.

13. An apparatus as set forth in claim 12 wherein said transmission means includes shaft means mounted on said trolley means and operatively connected to said other part of said telescopic element for rotation therewith, said supporting members including two pairs of levers supporting said carriage, one lever of each pair being secured to the ends of said shaft means, respectively, and the levers of each pair having gear parts meshing with each other so that the levers of each pair turn in opposite directions when said shaft means is turned.

14. An apparatus as set forth in claim 13 wherein said transmission means includes a worm screw secured to said other part of said telescopic element, and a worm gear meshing with said worm screw; and wherein said shaft is connected to said worm gear for turning movement.

15. An apparatus as set forth in claim 12 wherein said trolley means include two pairs of wheels adapted to roll on the floor; and wherein said carriage includes a pair of upper wheels and a pair of lower wheels; said rail means including an upper rail supporting said pair of upper wheels, and a lower rail supporting said pair of lower wheels of said carriage during movement of said carriage along said row of spindles.

16. An apparatus as set forth in claim 15 wherein each wheel of said carriage has a pair of axially spaced lateral portions laterally embracing the respective rail so that said carriage is supported on said rail means for movement along the same when said carriage is released by said supporting members.

17. In combination with a machine having two upright portions, a horizontal element between said portions, and a row of upright spindles supported on said connecting element, the spindles at the ends of the row and said upright portions defining two spaces extending a selected distance in the direction of said connecting element; horizontal rail means extending along said upright portions and said connecting element; a carriage guided on said rail means for movement in one direction past one of said spaces, then along said row of spindles, and then past the other of said spaces; trolley means adapted to move on a floor along the machine; means for mounting said carriage on said trolley means for relative movement in vertical direction and for movement with said trolley means along said rail means; adjustable means connecting said trolley means with said carriage and including operating means for moving said carriage and said trolley means toward and away from each other in vertical direction whereby said carriage can be raised to the level of said rail means while said trolley means is supported on the floor; a plurality of doffing means mounted on said carriage means for movement with the same, each doffing means including a pair of inclined spaced cam track members and extending in the direction of said connecting element a distance smaller than said selected distance, said cam track members of said doffing means defining together a composite cam track having in the direction of movement of said carriage a trailing portion located higher than the upper ends of the spindles so that a bobbin suported on the pair of cam track members of at least the last trailing doffing means is lifted off the respective spindle, each doffing means being mounted on said carriage for movement between an inoperative position located spaced from the row of spindles and an operative position in which said cam track members are located on opposite sides of the spindles for successively engaging and raising bobbins on the spindles during movement of said carriage; a holding member mounted on said last trailing doffing means for movement between an inoperative position and a holding position for holding a bobbin supported on the respective cam track members and lifted off the respective spindle; an operating member mounted on said last trailing doffing means and projecting into the region of the adjacent doffing means leading said last trailing doffing means, said operating member being operatively connected to said holding member and being engaged and shifted by said adjacent leading doffing means to shift said holding member from said inoperative position to said holding position when said adjacent leading doffing means moves from said operative position to said inoperative position; and control means located in the region of each of said spaces and successively operatively engageable with each doffing means which is located opposite said spaces during movement of said carriage for effecting movement of the respective doffing means from said inoperative position to said operative position when the respective doffing means passes said one space, and from said operative position to said inoperative position when the respective doffing means passes said other space.

18. In combination with a machine having a horizontal row of spindles; horizontal rail means mounted on the machine; a carriage guided on said rail means for movement along said row of operable elements; a unit for supplying bobbins to said spindles and mounted on said carriage for pivotal movement between an operative position alinged with said spindles and an inoperative position; and cam means secured to said machine and operatively engageable with said unit for shifting the same during carriage movement to said operative position before reaching the first spindle, and for shifting the same to said inoperative position after passing the last spindle of said row of spindles so that said unit can pass obstructing parts of the machine in said inoperative position.

19. An apparatus set forth in claim 18 wherein said machine has two end members aligned with said row of spindles and constituting said obstructing parts; and wherein said cam means include two cam members respectively located in the region of said end members.

20. In combination with a machine having a horizontal row of spindles; a carriage guided on said machine for horizontal movement parallel to said row of spindles; a chute mounted on said carriage and having an upper chute part, and a lower chute part terminating above said row of spindles; first stop means located at said upper chute of spindles; first stop means located at said upper chute part and having an inoperative position and a stop position for holding the first leading bobbin of a plurality of bobbins in said upper chute part; second stop means having an inoperative position and a stop position for holding the second leading bobbin; actuating means for simultaneously moving said first stop means to said inoperative position and said second stop means to said operative position thereof, and vice versa; and feeler means having an advanced position projecting into said lower chute part and a retracted inoperative position, said feeler means being operatively connected to said actuating means for effecting actuation of said first and second stop means in said advanced position so that said stop means release no bobbin when a bobbin in said lower chute portion holds said feeler means in said retracted position.

21. In combination with a machine having a horizontal row of spindles; a carriage guided on said machine for horizontal movement parallel to said row of spindles; a chute mounted on said carriage and having an upper chute part, and a lower chute part terminating above said row of spindles; first stop lever means located at said upper chute part and having an inoperative position and a stop position for holding the first leading bobbin of a plurality of bobbins in said upper chute part; second stop lever means having an inoperative position and a stop position for holding the second leading bobbin; pivot means connecting said first and second stop lever means for simultaneously moving said first stop lever means to said inoperaitve position and said second stop lever means to said operative position thereof, and vice versa; drive means; coupling feeler means for connecting said drive means with said first and second stop lever means and being movable between a coupling position projecting into said lower chute part and a disengaged position located outside of said chute, and tending to move to said coupling position when said lower chute part is not filled with bobbins whereby said drive means actuate said first and second stop lever means to release bobbins from said upper chute part when said lower chute part contains no bobbins.

22. An apparatus as set forth in claim 21 wherein said machine includes horizontal rails, and wherein said carriage has wheels rolling on said rails; and wherein said drive means includes an eccentric member supporting said coupling feeler means, and transmission means connecting said eccentric member with one of said wheels so that the release of bobbins takes place in synchronism with the carriage movement.

23. An apparatus as set forth in claim 21 wherein said upper chute part includes an inclined plate for supporting a series of bobbins, said inclined plate having cutouts; and wherein said first and second stop lever means are located below said plate and terminate in stop portions projecting through said cutouts in said stop positions.

24. An apparatus as set forth in claim 21 and including spring means connected to one of said stop lever means for holding said first stop lever means in said stop position.

25. In combination with a machine having a horizontal row of spindles; horizontal rail means mounted on the machine; a carriage guided on said rail means for movement along said row of spindles; a unit for supplying bobbins to said spindles and mounted on said carriage for pivotal movement between an operative position aligned with said spindles and an inoperative position, said unit including a chute mounted on said carriage and having an upper chute part, and a lower chute part terminating above said row of spindles, first stop means located at said upper chute part and having an inoperative position and a stop position for holding the first leading bobbin of a plurality of bobbins in said upper chute part, second stop means having an inoperative position and a stop position for holding the second leading bobbin, and means for simultaneously moving said first stop means to said inoperative position and said second stop means to said operative position thereof, and vice versa; and cam means secured to said machine and operatively engageable with said unit for shifting the same during carriage movement to said operative position before reaching the first spindle, and for shifting the same to said inoperative position after passing the last spindle of said row of spindles so that said unit can pass obstructing parts of the machine in said inoperative position.

26. In combination with a machine having a horizontal row of spindles; horizontal rail means mounted on the machine; a carriage guided on said rail means for movement along said row of spindles; a unit for supplying bobbins to said spindles and mounted on said carriage for pivotal movement between an operative position aligned with said spindles and an inoperative position, said unit including a chute mounted on said carriage having an upper chute part and a lower chute part terminating above said row of spindles, first stop lever means located at said upper chute part and having an inoperative position and a stop position for holding the first leading bobbin of a plurality of bobbins in said upper chute part, second stop lever means having an inoperative position and a stop position for holding the second leading bobbin, pivot means connecting said first and second stop lever means for simultaneously moving said first stop lever means to said inoperative position and said second stop lever means to said operative position thereof, and vice versa, drive means coupling feeler means for connecting said drive means with said first and second stop lever means and being movable between a coupling position projecting into said lower chute part and a disengaged position located outside of said chute, and tending to move to said coupling position when said lower chute part is not filled with bobbins whereby said drive means actuate said first and second stop lever means to release bobbins from said upper chute part when said lower chute part contains no bobbins; and cam means secured to said machine and operatively engageable with said unit for shifting the same during carriage movement to said operative position before reaching the first spindle, and for shifting the same to said inoperative position after passing the last spindle of said row of spindles so that said unit can pass obstructing parts of the machine in said inoperative position.

References Cited in the file of this patent

UNITED STATES PATENTS

| | | |
|---|---|---|
| 1,101,812 | Peterson | June 30, 1914 |
| 1,795,300 | Evcichjevitz | Mar. 10, 1931 |

FOREIGN PATENTS

| | | |
|---|---|---|
| 9,529 | Great Britain | of 1914 |